United States Patent [19]

De Busscher et al.

[11] 4,248,248

[45] Feb. 3, 1981

[54] INTERRUPTED INFEED FLIGHT MEANS FOR COMBINE ROTOR

[75] Inventors: Cyriel R. J. De Busscher, Sijsele; Francois Van Herpe, Vlierzele, both of Belgium

[73] Assignee: Sperry Rand Corporation, New Holland, Pa.

[21] Appl. No.: 27,590

[22] Filed: Apr. 6, 1979

[51] Int. Cl.³ .............................................. A01F 12/18
[52] U.S. Cl. ............................... 130/27 HA; 56/14.6; 130/27 T
[58] Field of Search ............. 56/14.6; 130/27 R, 27 T, 130/27 H, 27 HA

[56] References Cited

U.S. PATENT DOCUMENTS

| 4,078,571 | 3/1978 | Todd et al. | 56/14.6 |
| 4,177,821 | 12/1979 | Peiler et al. | 130/27 T |
| 4,178,943 | 12/1979 | West | 56/14.6 |

FOREIGN PATENT DOCUMENTS

| 2395 | 6/1931 | Australia | 130/27 |
| 220319 | 9/1925 | United Kingdom | 130/27 T |

Primary Examiner—Robert A. Hafer
Attorney, Agent, or Firm—C. Hercus Just; Frank A. Seemar; John B. Mitchell

[57] ABSTRACT

A rotor for an axial flow combine which is adapted to coact with conventional grate means in said combine, said rotor having on the forward end thereof interrupted infeed flight means which are spiral segments spaced both axially and circumferentially from each other, and certain of the leading ends of said flight segments in the direction of rotation of the rotor extending radially a limited distance beyond the outer edges of said segments to provide aggressive engagement of said segments with crop material being delivered to said flight from conventional elevator mechanism and the like normally employed in combines.

8 Claims, 5 Drawing Figures

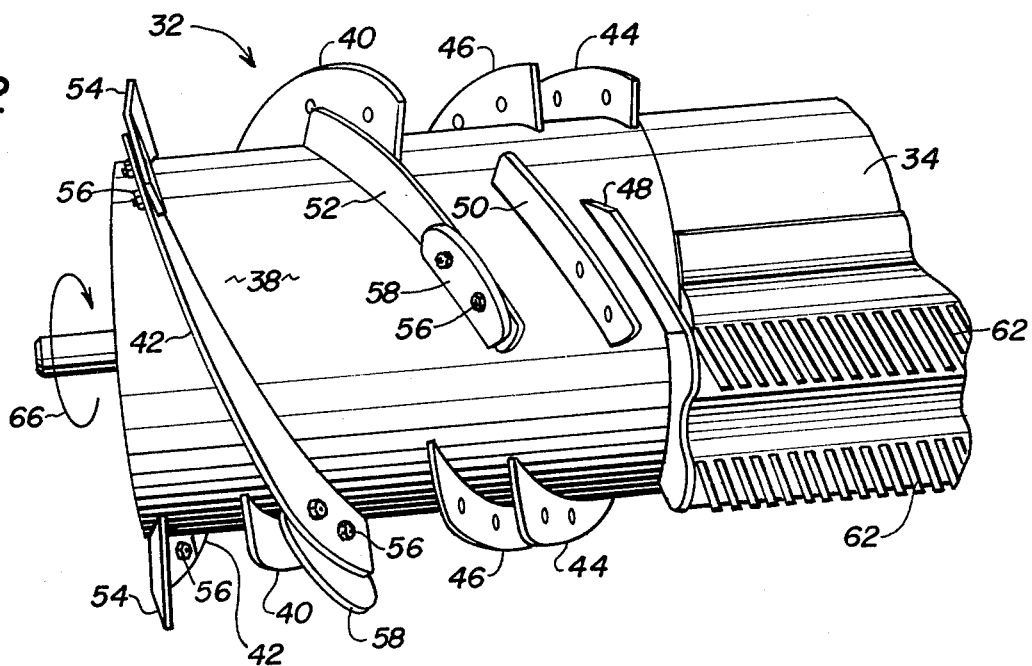
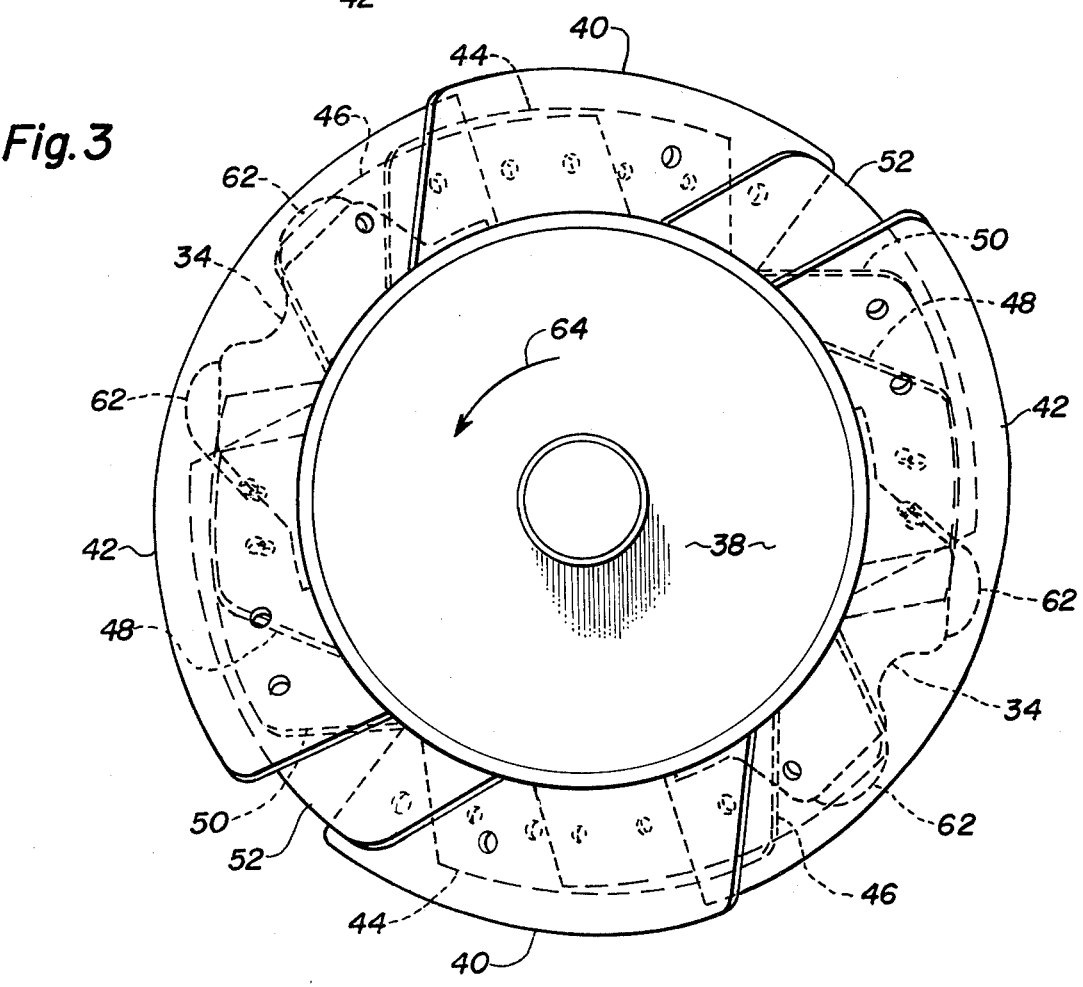

INTERRUPTED INFEED FLIGHT MEANS FOR COMBINE ROTOR

BACKGROUND OF THE INVENTION

The present invention pertains to axial flow type harvesting machines, particularly combine harvesters which are referred to hereinafter as combines. The particular type of combine to which the present invention preferably pertains comprises a combine which has cutting and transverse consolidating means affixed to a detachable frame commonly called a header on the combine's forward end for cutting agricultural crop materials which are to be harvested and threshed by the combine. The consolidated crop material is elevated by conventional elevator means to the forward end of a threshing section in which one or more rotors extend axially and are cooperable with respective concaves to effect the threshing of the crop material. It is not uncommon for the consolidated crop material to be delivered in bunches, somewhat in a twisted or knotted condition, to the forward end of the threshing means. This bunching or "roping" renders the operation of the threshing means difficult and inefficient because of the nature of the material.

For purposes of facilitating the feeding of such material to the threshing means of the combine, the rotors thereof, whether singly or in multiples, are currently provided with auger means having continuous spiral flights which engage the material from the upper end of the elevating means and insure the positive feeding thereof directly into the forward end of the threshing means. One example of a typical combine of this type is illustrated in U.S. Pat. No. 3,848,609 to Mortier et al., dated Nov. 19, 1974. The auger means of the aforementioned type, having a generally smooth external edge, merely operate to positively feed to the threshing means the material in the condition in which it is received from the upper end of the elevating means. Hence, if it is ensnarled, knotted or in rope-like masses when received by the auger means, it is moved in substantially the same condition to the threshing means.

Various means have also been employed in efforts to minimize the difficulties occasioned in axial flow type combines with respect to knotted, roped and snarled masses of material as distinguished from a more or less even flow of the same to the threshing means. One such attempt comprises the subject matter of U.S. Pat. No. 3,537,460, to Van Buskirk, dated Nov. 3, 1970. In said combine, generally rectangular-shaped impeller blades are formed on conical base means mounted upon the forward end of the rotor of the combine. These impeller blades extend tangentially from the core of the conical support and have scooped portions along the forward and outer edges thereof in an attempt to somewhat meter the delivery of material to the threshing means. Therefore, while different from the auger of the Mortier patent, the impeller blade arrangement of the Van Buskirk patent does not appear to solve the problem of how to minimize the feeding of knotted, roped and snarled masses of material from the elevating means to the threshing means of a combine in which conventional rotor and grate means are employed to effect the threshing.

SUMMARY OF THE INVENTION

It is the principal object of the invention to provide infeed flight means on the forward end of a combine rotor in which the flight means are interrupted and actually comprise a series of spiral segments which are not only spaced axially from each other but also are spaced circumferentially from each other around supporting base means attached to the forward end of the rotor of an axial flow type combine, whereby the leading ends and edges of the segments in the direction of rotation of the rotor provide aggressive means which extend radially and tear into any masses or snarled bunches of crop material and thereby tend to tear apart the snarled masses with each successive engagement thereof by oncoming leading edges of other segments of said infeed flight means, thus tending to smooth out the flow of crop material to the inlet end of the threshing means comprising the conventional type of rotor and concave, whether of a single or multiple rotor and concave type.

Another object of the invention is to arrange certain successive segments of the flight means to extend radially greater limited distances than other segments, thereby providing increased aggressiveness for the infeed flight means.

A further object of the invention is to arrange certain of the successive segments so as to extend radially limited distances beyond the outer surfaces of the conventional rasp bars of axial flow type rotors and thereby, tend to maximize the aggressive engagement of the segments with the crop material being handled thereby.

Another object of the invention comprises the provision of supplemental flight extensions attached to the leading ends of the forwardmost segments of the flight means and extend limited radial distances from the other edges of said segments to provide effective aggressive initial engagement of said flight means with the material delivered thereto from the elevating means of the combine.

A still further object of the invention is to dispose the edges of the leading ends of said segments of the flight means at a limited angle slightly less than radial to the axis of the rotor and thereby provide leading corners which are effective to aggressively engage the agricultural material and thereby tend to unsnarl and separate knots or rope-like masses of crop material, especially moist green grasses, such as rye, prior to moving the same to the threshing elements of the combine.

Still other objects of the invention are to provide base members for said flight means which are, selectively, either substantially cylindrical or having at least a frusto-conical forward end, as desired, and thereby suit the flight means to maximum efficiency incident to operating upon different types of agricultural crop material.

One further object of the invention is to arrange the interrupted flight means on the forward end of the rotor so that the outer edges of the forwardmost segments of said flight means extend radially a greater distance than the rearwardly succeeding segments and thereby approximately conform the radial path described by said segments generally to the upper surface of throat means which extends upwardly and rearwardly from the upper end of elevating means and underlies the flight means of the present invention.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 2 is a side elevation of the forward end of a combine rotor of the type shown in FIG. 1 and upon the forward end of which interrupted infeed flight means comprising one embodiment of the present invention are illustrated.

FIG. 3 is an end view of the interrupted infeed flight means shown in FIG. 2, as seen from the left-hand end thereof.

DETAILED DESCRIPTION OF THE PREFERRED EMBODIMENT

Figure 1:
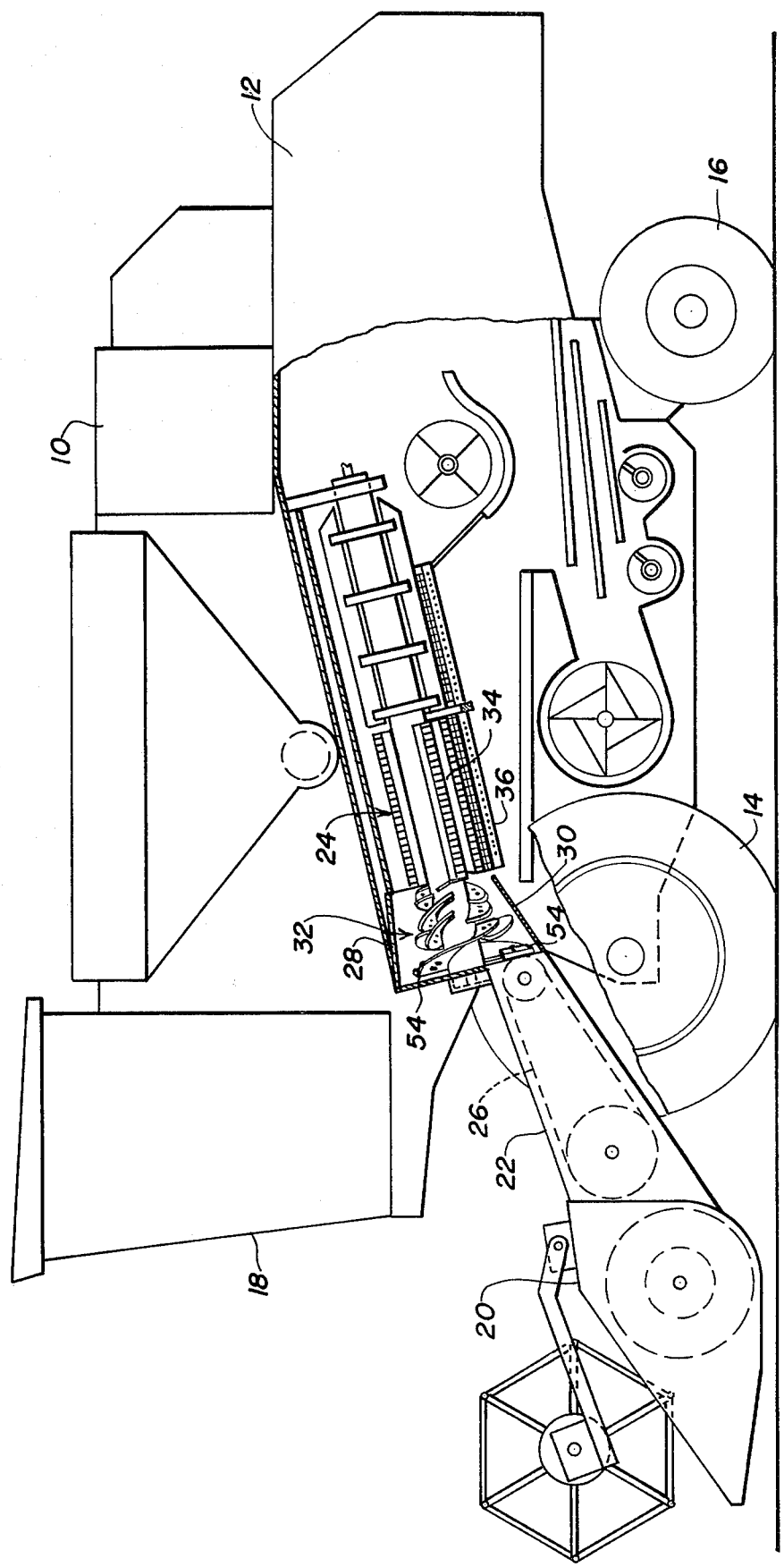
FIG. 1 is a side elevation of an exemplary combine of the type to which the present invention pertains, part of said combine being broken away to expose details of the interior thereof to facilitate illustration of the present invention.

Referring to FIG. 1, there is illustrated in side elevation therein, an exemplary combine of the axial flow type to which the present invention pertains. Said combine is of the mobile type and self-powered by conventional means, such as a diesel engine 10, mounted on top of the elongated housing 12 supported by a frame upon which forward drive wheels 14 are mounted and rearward steering wheels 16 are supported for actuation by steering means, not shown, within the cab 18, on the forward end of the housing 12. A conventional header 20 extends forwardly from the housing 12 and includes cutter and consolidating means, not shown in detail, which cuts and transversely consolidates crop material from a relatively wide swath thereof and delivers crop to the elevating mechanism 22 which extends upwardly and rearwardly from the header 20 to the forward, inlet end of the threshing compartment 24. The elevating mechanism 22 includes an endless conveyor 26 which terminates at the upper inward end thereof adjacent a shroud 28, having a bottom, transversely curved floor 30 which extends upwardly and rearwardly and terminates adjacent the inlet end of the threshing compartment 24. The shroud 28 encloses the interrupted infeed flight means 32 comprising the principal improvement afforded by the present invention.

Mounted with the threshing compartment 24 is a longitudinally extending rotor 34, the forward end of which comprises threshing means which includes both the rotor 34 and concaves 36 of conventional type, such as the kind illustrated in greater detail in said prior U.S. Pat. No. 3,848,609. Other features of the combine, not especially associated with the present invention, are also illustrated in FIG. 1 and the details and nature thereof are illustrated and explained in said aforementioned patent, No. 3,848,609, to which attention is directed for a description thereof.

Figure 4:
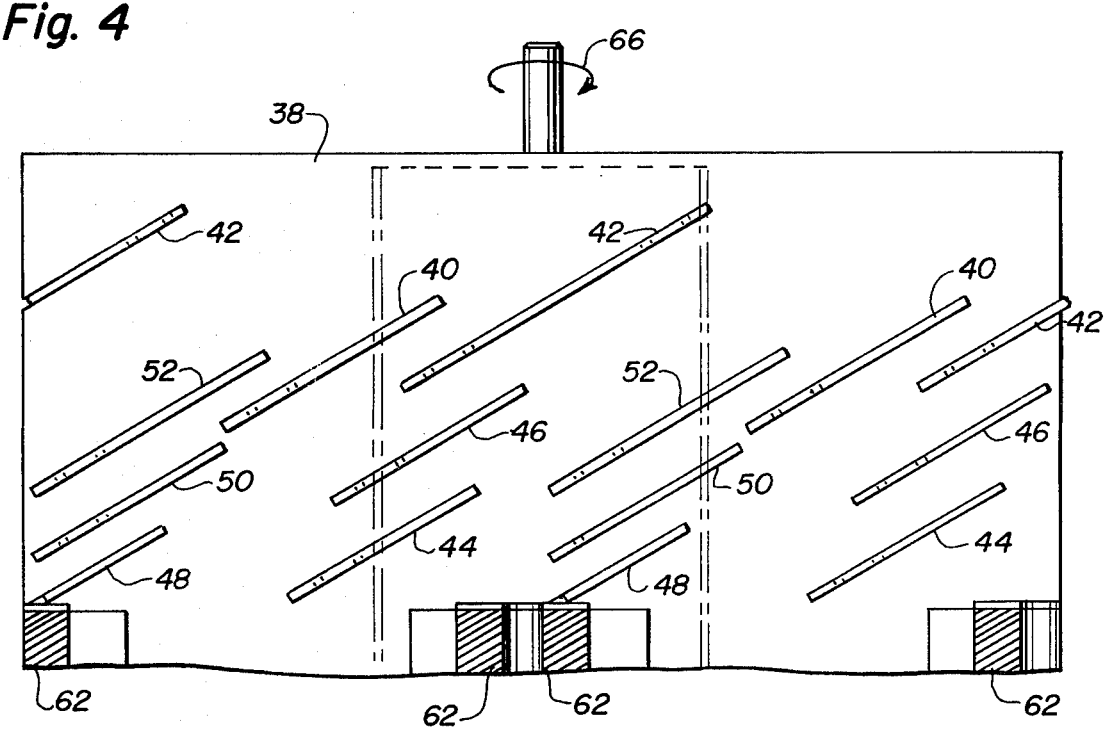
FIG. 4 is a diagrammatic illustration of the arrangement of flight segments shown in FIGS. 2 and 3, and illustrated in plan view as a flat surface comprising an unwrapping of the cylindrical surface of the flight means shown in said preceding figures.

Referring particularly to FIGS. 2 and 3, one embodiment of the present invention is shown in detail. It will be seen that the interrupted flight means 32 is connected to the forward end of the rotor 34 and includes a substantially cylindrical base member 38 upon which a plurality of different flight members are connected to the outer surface thereof by fixed means, such as welding or otherwise. The axis of the base member 38 is coaxial with and integrally connected to the forward end of rotor 34. The flight means 32 respectively comprise segments of different radial elevation which are spaced axially from each other and also are spaced circumferentially from each other. As best shown in FIGS. 2 and 3, and especially FIG. 2, it will be seen that the different segments are staggered with respect to each other. For the purpose of graphically illustrating the general diagrammatical layout of the various segments, attention is directed to the diagrammatic unwrapped version of the surface of the base member 38 shown in FIG. 4. The various segments illustrated therein are in spaced and staggered relationship, the details of which are described hereinafter.

Certain of the segments 40 and 42, which are of a spiral nature and curved, project a greater distance radially from the axis of the base member 38 than certain other segments described below. As can be best seen from FIG. 3, the outer surface of the segment 42 extends radially even a slightly greater amount than the outer surface of the segment 40. This is for purposes of being described with respect to the relationship of the overall flight means 32 relative to the shroud 28 and particularly the floor 30 thereof, as set forth hereinafter.

Staggered with respect to the segments 40 and 42, are certain additional segments 44 and 46, which respectively are of a lesser radial dimension than the segments 40 and 42, as best shown in FIG. 3. It will additionally be seen in FIG. 3 that the segments 46 are of a lesser radial dimension at the outer edges thereof than the segments 44. Of still lesser radial dimensions of the outer surfaces thereof than the segments 44 and 46 are the further segments 48 and 50, which are substantially of the same radial dimensions. Segments 52, however, as is readily seen from FIGS. 2 and 3, are of a greater radial dimension of the outer edges thereof than the segments 48 and 50, but lesser radial dimension than the segments 40 and 42.

As best shown in FIG. 2, the forwardmost segments 42 in particular are axially offset and provided with additional and supplemental flight extensions 54 to provide maximum aggressive engagement of the crop material by the various segments. The flight extensions 54 are connected by suitable bolts 56 to the segments 42 and extend through appropriate holes therein. Thus, as shown in FIGS. 2 and 3, the effective radial dimension of the outer, forward end of flight means 32 is increased and, as best shown in FIG. 1, conforms to the somewhat conical shape of the shroud 28, and particularly the floor 30 thereof. This particular structural arrangement permits the overall outline of the path of movement of the outer surfaces of the various segments to generally conform to, but be spaced from, the frusto-conical disposition of the shroud 28 and floor 30, as can readily be visualized from FIG. 1.

In addition to the flight extensions 54, the present invention also includes the provision of certain wear plates, which are known in the trade as wiffle plates 58 and are shown in exemplary manner in FIG. 2. The plates 58 are connected, for example, to one of the segments 42 and another to one of the segments 52, it being understood that other segments on the opposite side of the flight means 32 from that shown in FIG. 2, are also included on the flight means mounted thereon. Especially as can be visualized from the lower wiffle plate 58 shown in FIG. 2, the outer surface thereof is rounded and extends a substantial distance radially beyond the outer surface of the segment 42. Such arrangement provides increased aggressive engagement of the flight means with the knotted, roped and matted material which may be engaged thereby when such material reaches the flight means 32 of the present invention. The objectives of the instant invention are thus facilitated by the addition of such additional wear plates, plus the flight extensions 54, for purposes of ripping and tearing the material in an effort to smooth out the flow thereof and thereby maximize the overall efficiency and effectiveness of the combine incident to threshing various crop materials.

Figure 5:
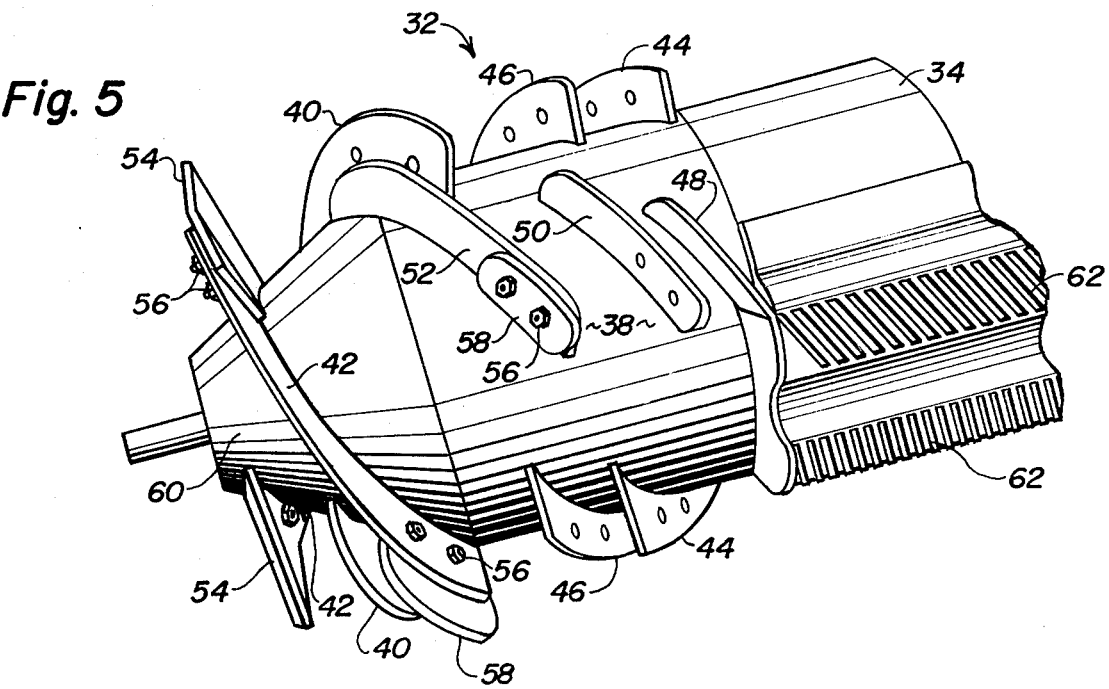
FIG. 5 is a fragmentary view similar to FIG. 2 but illustrating another embodiment of the present invention.

While the embodiment shown in FIGS. 2 and 3 primarily contemplates the use of a cylindrical base member 38, another embodiment of the invention is illustrated in FIG. 5. This embodiment contemplates the inclusion of a frusto-conical forward end 60 of the base member 38 which, in the rearward portion thereof, preferably is substantially cylindrical. In order that the benefits of the invention described above with respect to the first embodiment may be maintained, the radial dimension of the outer ends of the flight extensions 54 and also the wiffle plates 58 are arranged so that the path described thereby will be in conformity with the generally frusto-conical pattern of said outer ends. The outer ends of the flight extensions 54 and wiffle plates 58 are complementary to the upwardly and rearwardly sloping floor 30 and additionally provide a somewhat greater amount of space at the initial entry of the crop material for engagement by the flight means 32, as distinguished from the substantially cylindrical configuration of the base member 38 shown in FIGS. 2 and 3.

For purposes of graphically illustrating in exemplary manner the relative relationship of the radial dimensions of the various segments with respect to the rotor 34, the portions of the rotor 34 which support the rasp bars 62 are shown in phantom in FIG. 3. Further for purposes of illustrating the effectiveness and particularly the angular relationship of the leading edges of the various segments with respect to a radial projection of the rotor 38, attention is directed to FIG. 3 in which the leading edges of the various segments are shown as being at a relatively small angle with respect to a true radius, when considered relative to the direction of rotation of the rotor 38, which is indicated in the directional arrow 64, shown in FIG. 3. Similarly, the directional arrow 66 in FIG. 2 indicates the direction of rotation of the rotor and flight means 32 connected to the forward end thereof.

The foregoing description illustrates preferred embodiments of the invention. However, the concepts presented herein may, based upon such description, be employed in other embodiments without departing from the scope of the invention. Accordingly, the following claims are intended to protect the invention broadly, as well as in the specific forms shown herein.

Having thus described the invention, what is claimed is:

1. A rotor for an axial flow type mobile combine having threshing means extending longitudinally therealong rearwardly from the forward end thereof and including rasp bars and the like, in combination with flight means on the forward infeed end of said rotor operable to engage harvested agricultural material delivered thereto from the forward end of a combine, said flight means comprising interrupted flight segments arranged in a substantially spiral overall pattern and connected to a base member coaxial with said rotor, said interrupted segments being in axially offset and staggered relationship to each other by being longitudinally and circumferentially spaced along the surface of said base member from the forward end thereof toward the rearward end of said rotor to provide a substantial multiplicity of leading edges to attack the material aggressively, said rotor being operable for unidirectional rotation and the leading ends of said segments in the direction of rotation of said rotor being adapted to aggressively engage said agricultural material in a ripping and tearing manner to disintegrate any knotted masses thereof and thereby feed the same in a relatively even manner longitudinally rearward for engagement by the threshing means on said rotor.

2. The rotor according to claim 1 in which certain successive segments of said flight means extend radially greater limited distances than other segments, thereby to provide increased aggressiveness for said material engaging means.

3. The rotor according to claim 1 in which certain of said segments of said flight means extend radially limited distances beyond the outer surfaces of the rasp bars of said rotor.

4. The rotor according to claim 3 in which certain other segments in succession with said first mentioned segments are radially shorter limited distances than the outer surfaces of the rasp bars of said rotor.

5. The rotor according to claim 1 further including supplemental flight extensions attached to said leading ends of the forwardmost segments of said flight means and extending limited radial distances therefrom to provide effective aggressive initial engagement of said material engaging means on said forward end of said rotor.

6. The rotor according to claim 1 in which the edges of the leading ends of said segments of said flight means are at a limited angle slightly less than radial and thereby provide leading corners effective to aggressively engage said crop material.

7. The rotor according to claim 1 in which the forward end of said base member of said flight means is frusto-conical and the flight segments thereon are provided with radial extensions fixed thereto which have outer ends extending radially at least to the radial extent of the flight segments on rearward portion of said base and said rearward portion being substantially cylindrical.

8. The rotor according to claim 1 further in combination with rearwardly and upwardly extending throat means extending upwardly from elevating means in the forward portion of a combine and underlying said flight means, and at least portions of the outer edges of the forwardmost segments of said flight means extend radially a greater distance than rearwardly succeeding segments and thereby substantially conform the radial path described by said segments generally to the upper surface of said throat means.

* * * * *